UNITED STATES PATENT OFFICE.

OSCAR H. COUMBE, OF WASHINGTON, D. C., AND ROBERT R. ROBERTS, OF NEW ORLEANS, LA., ASSIGNORS, BY DIRECT AND MESNE ASSIGNMENTS, OF ONE-HALF TO M. J. WINE, OF WASHINGTON, D. C.

SUBSTITUTE FOR BUTTER.

SPECIFICATION forming part of Letters Patent No. 266,777, dated October 31, 1882.

Application filed May 13, 1882. (No specimens.)

*To all whom it may concern:*

Be it known that we, OSCAR H. COUMBE, of Washington city, in the District of Columbia, and ROBERT R. ROBERTS, of New Orleans, Louisiana, have invented an Improved Article of Commerce, which we call "Butteroid," and of which the following is a full, clear, and exact description.

Take of crude or refined cotton-seed oil, or any other suitable vegetable oil (preferably the former,) say, about twenty gallons, and heat it to 90° Fahrenheit (more or less) by means of steam-coils, and then add slowly about one gallon of caustic soda at about 40° barometer while the whole is being violently agitated. With specially-heavy oils it is not necessary sometimes to add more than half a gallon of the caustic soda to bring the oil to a light straw-color. The mixture is then allowed to settle and the supernatant oil is separated by decantation. About seventy-five parts of the oil thus prepared is then emulsified with about twenty parts of corn-starch, or any other wholesome farinaceous flour; but we prefer the corn-starch, the same having first been thoroughly cooked in salt and water of the strength of five parts of salt to twenty parts of water. Thorough incorporation can be accomplished in a large mortar with heavy pestle, worked by any well-known power. The coloring material should be added before working in the mortar. After having been thus prepared, the whole mass should be transferred to a suitable churn and churned in the usual manner. Then place it in a suitable vessel and work the "oil-milk" thoroughly out of the mass and add the flavoring, preferably using six drops of butyric ether to the gallon, and the mass becomes what we term "butteroid"—a most excellent and wholesome vegetable substitute for butter.

Having thus explained our invention, what we claim as new, and desire to secure by Letters Patent, is—

1. An improved article of commerce known as "butteroid," and consisting of cotton-seed or other vegetable oil treated with a solution of caustic soda, in combination with farinaceous flour first thoroughly cooked in salt-water, substantially as herein described.

2. The process herein described for the production of butteroid, which consists in raising vegetable oil to a temperature of about 90° Fahrenheit, and slowly adding a cold solution of caustic soda, then adding farinaceous flour first thoroughly cooked in salt and water and completely incorporating the mass, and then working out the oil-milk, and lastly coloring and flavoring, substantially as herein described, and in the proportions named.

OSCAR H. COUMBE.
ROBERT R. ROBERTS.

Witnesses:
H. B. APPLEWHAITE,
E. J. REDMOND.